United States Patent Office 2,985,487
Patented May 23, 1961

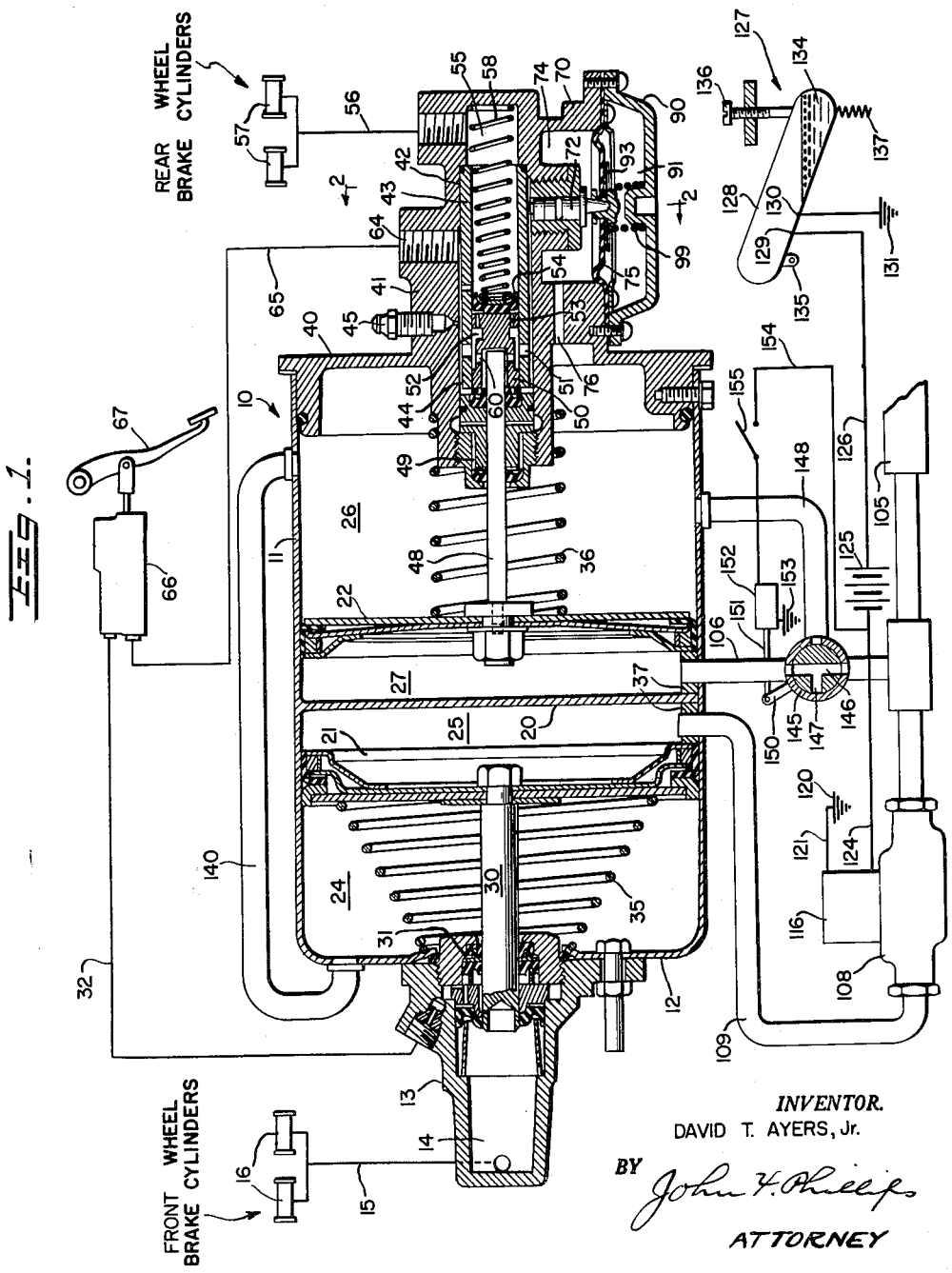

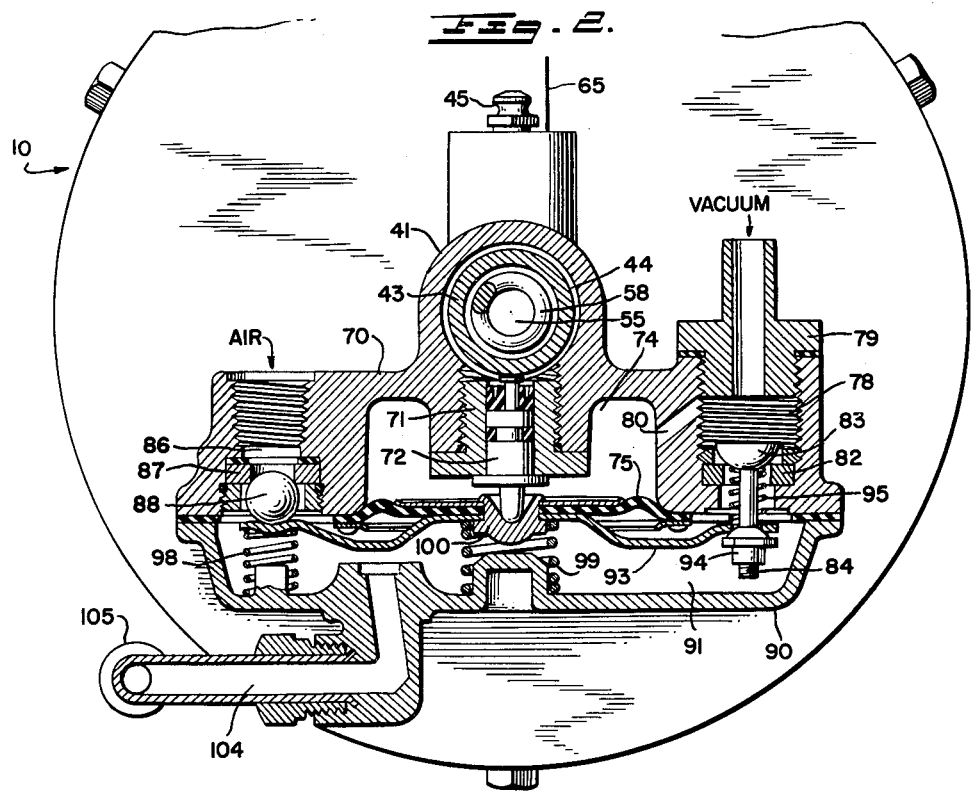
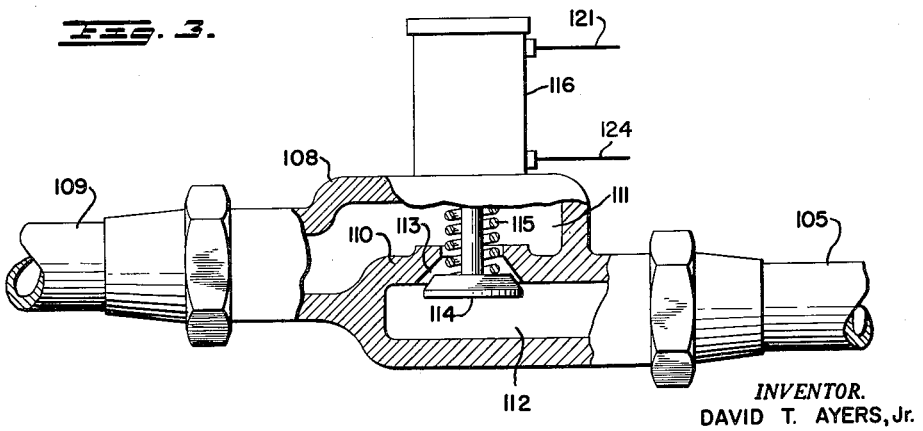

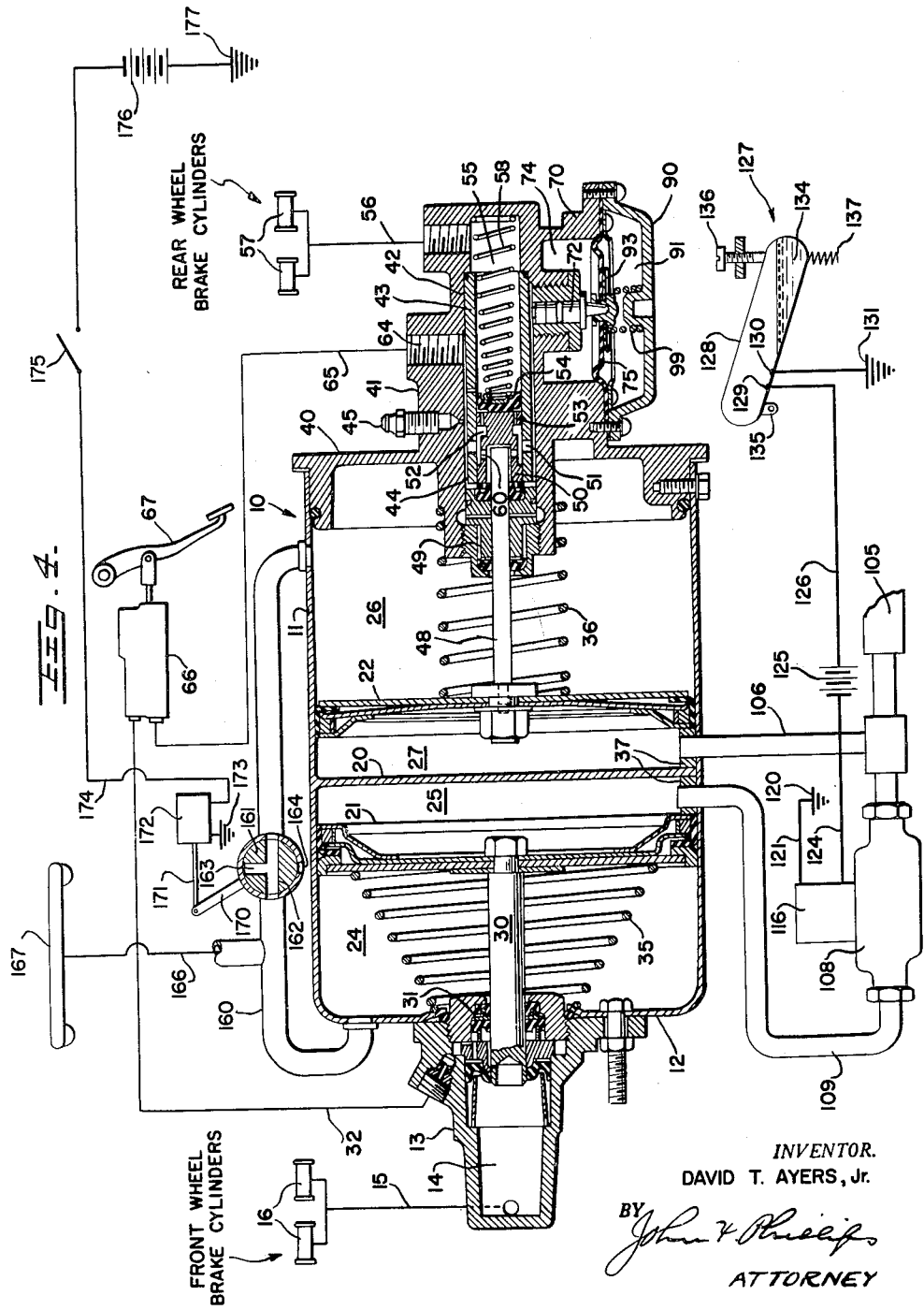

2,985,487

PROPORTIONAL BRAKE MECHANISM FOR FRONT AND REAR VEHICLE BRAKES

David T. Ayers, Jr., Birmingham, Mich., assignor to Kelsey-Hayes Company, a corporation of Delaware Filed Aug. 22, 1956, Ser. No. 605,541

10 Claims. (Cl. 303—6)

This invention relates to a booster brake mechanism, and more particularly to such a mechanism for use on light delivery trucks.

In brake installations on passenger vehicles it is the common practice to provide greater braking effort on the front wheels than the rear wheels due to heavier weight supported by the front wheels. The weight on the rear wheels of such vehicles, of course, varies according to such factors as the number of passengers on the rear seat. This, however, is not a major factor since there is not too much variation in the maximum loads applied to the rear wheels.

The foregoing, however, is not true in connection with trucks. For example, in light delivery trucks, when traveling with no load or with a light load, excessive braking is provided at the rear wheels since heavy braking is required when the truck is heavily loaded to multiply the weight supported by the rear wheels. As a result, conventional braking systems leave much to be desired as applied to trucks of the type referred to since it does not require a very substantial brake application to lock and slide the rear wheels when the vehicle is traveling light.

In the copending application of David T. Ayers, Jr., and Edward Govan Hill, Serial No. 474,804, filed December 13, 1954, there is disclosed a booster motor in the form of a cylinder divided between its ends to form separate motor units each provided with a pressure responsive unit. The apparatus has wide application and is highly advantageous for use on passenger cars for reasons explained in the copending application referred to. In such construction, a valve mechanism energizes the two motor units and is operated by fluid displaced from a pedal operated master cylinder, the manually generated pressure being applied against the fluid displacing plunger associated with one of the motor units. Such unit, in passenger car practice, is employed for applying the front wheel brakes while the other motor unit is operated by fluid pressure alone to apply the rear wheel brakes. Application of the rear wheel brakes, therefore, is limited by maximum energization of the associated motor unit to minimize the locking and sliding of the rear wheels, while the use of power plus foot generated pressures permits substantially unlimited braking efforts at the front wheels.

In the copending application of Edward Govan Hill, Serial No. 523,309, filed July 20, 1955, now abandoned, there is shown an improvement over the copending application discussed above, wherein locking and sliding of the rear wheels of a passenger vehicle is substantially eliminated by employing an inertia-controlled valve which closes to minimize energization of the motor unit for the rear wheels when the rate of vehicle deceleration reaches a predetermined point, thus substantially eliminating the locking of the rear wheels of a passenger vehicle.

An important object of the present invention is to provide a booster mechanism for motor trucks wherein the motor of the copending applications referred to above is reversed so that power alone is depended upon for applying the front wheel brakes while power plus foot generated forces is employed for applying the rear wheel brakes, and to provide such an arrangement with means for minimizing the application of the rear wheel brakes when a truck is traveling light, to prevent the excessive braking of the rear truck wheels.

A further object is to provide such an apparatus wherein energization of the booster motor unit for the rear wheels of a truck may be prevented, whereby the front wheel brakes will be applied by the booster unit associated therewith and the rear wheel brakes will be applied solely by foot generated pressures while still utilizing the pedal operable master cylinder for controlling the valve mechanism for the front wheel booster motor unit.

A further object is to provide such an apparatus wherein each motor unit is provided with a normally constant pressure chamber and a variable pressure chamber with the pressures in the latter chambers controlled by a pedal operable master cylinder which is utilized to operate the valve mechanism for the motor units and to assist the motor unit for the rear wheel cylinders in applying the rear brakes, and to provide manually operable means for opening to communication with each other the constant pressure and variable pressure chambers for the motor unit associated with the rear brakes and to cut off communication between such variable pressure chamber and the valve mechanism, thus preventing energization of the rear brake motor unit so that the rear brakes will be applied solely by pedal pressures.

A further object is to provide such an apparatus having two motor units of the character referred to and to prevent energization of the motor for the rear brake unit by opening to the atmosphere the constant pressure chamber of the rear brake motor unit to prevent energization of such motor unit for the same purpose, namely, to provide for application of the rear brakes solely by pedal generated pressures.

A further object is to provide such a braking system wherein the motor units are of the normally vacuum suspended type with both normally constant pressure chambers connected to a source of vacuum, and to interpose between the vacuum source and the normally constant pressure chamber of the rear wheel motor unit a three-way valve operable for disconnecting the last-named variable pressure chamber from the source and connecting it to the atmosphere without affecting the connection of the constant pressure chamber of the front wheel motor to the source of vacuum.

A further object is to provide such a mechanism which will be made of greater capacity than on passenger cars whereby under certain conditions the front wheel brakes may tend to lock under a heavy brake application, and to provide means associated with the front wheel motor unit for limiting energization thereof when the rate of vehicle deceleration reaches a predetermined point, regardless of whether the rear wheel cylinders are being operated solely by foot generated pressures or by foot generated pressures plus motor forces.

Other objects and advantages of the invention will become apparent during the course of the following description.

In the drawings I have shown one embodiment of the invention. In this showing:

Figure 1 is a longitudinal sectional view through the booster motor unit, the remaining parts of the system being diagrammatically represented;

Figure 2 is an enlarged sectional view on line 2—2 of Figure 1;

Figure 3 is an enlarged side elevation of the inertia-controlled valve mechanism, parts being shown in section; and Figure 4 is a view similar to Figure 1 showing a modified type of mechanism.

Referring to Figure 1, the booster motor, as will become apparent, is very similar to the motor employed in the two copending applications referred to above. Such motor is indicated as a whole by the numeral 10 and comprises a cylinder 11 closed at one end by a preferably integral head 12 to which is secured a housing 13 having a hydraulic chamber 14 therein. This chamber is connected as at 15 to the front wheel brake cylinders 16 of the truck.

The cylinder 11 is provided intermediate its ends with a partition wall 20 dividing the motor to form a pair of motor units in which are respectively reciprocable pistons 21 and 22. The piston 21 divides its associated motor unit to form a constant pressure chamber 24 and a variable pressure chamber 25, while the piston 22 divides its motor unit to form a normally constant pressure chamber 26 and a variable pressure chamber 27.

A piston rod 30 is connected at one end to the piston 21 and projects through suitable bearing and sealing means 31 into the chamber 14 to displace fluid into the front wheel cylinders 16. Means forming no part of the present invention is provided for replenishing fluid in the chamber 14 and comprises a hydraulic fluid supply line 32 supplied with fluid in a manner to be described.

Return springs 35 and 36 respectively bias the pistons 21 and 22 to their normal off positions. Movement of the pistons to off positions is limited by spacers 37 and the reason for employing such spacers will become apparent below.

The other end of the cylinder 11 is closed by a preferably die-cast head 40 from which projects an integral body 41 having a bore 42 in which is mounted a sleeve 43. The left-hand end of the bore 42 is enlarged to provide an annular space or chamber 44 from which air may be bled by a conventional bleed plug 45.

A piston rod 48 is connected at one end to the piston 22 and is slidable through suitable bearing and sealing means 49 carried by the body 41. The piston rod 48 is adapted to transmit forces from the piston 22 to a plunger 50 slidable in the sleeve 43. The sleeve is provided with ports 51 for the flow of fluid from the chamber 44 into an annular space 52 surrounding the plunger 50. The plunger 50 in the right-hand end thereof, as viewed in Figure 1, is provided with small fluid passages 53 for the flow of fluid from the space 52, past a resilient packing cup 54, into a hydraulic chamber 55 formed within the sleeve 43 and body 41. From such chamber, fluid flows through lines 56 into the rear wheel brake cylinders 57. The plunger 50 is biased to its normal position shown in Figure 1 by a spring 58. From the space 52, hydraulic fluid can also flow behind the plunger 50 through ports 60.

A port 64 communicates between the chamber 44 and a fluid line 65 leading to a conventional master cylinder 66 operable by a pedal 67. The master cylinder 66 is provided with the usual plunger (not shown) and the reservoir of the master cylinder 66 (not shown) may supply fluid to the line 32.

Fluid displaced from the master cylinder 66 applies pressure behind the plunger 50, as will become apparent, and such fluid pressure also is utilized for operating a valve mechanism to control pressures in the motor chambers 25 and 27. Such valve mechanism is shown in Figure 2. The body 41 is provided with an annular enlargement 70 the axis of which is perpendicular to the axis of the sleeve 43. The enlargement 70 carries a plug 71 forming a cylinder receiving a sealed piston 72, the upper end of which obviously is subject to pressure in the chamber 44. The cylinder 71 is surrounded in the enlargement 70 by a chamber 74 sealed at the bottom thereof by a diaphragm 75. The chamber 74 is in open communication with the motor chamber 26 through a passage 76 (Figure 1).

At one side thereof, the enlargement 70 is provided with a vacuum chamber 78 communicating with the interior of a nipple 79 suitably connected to a source of vacuum. The chamber 74 communicates with the vacuum chamber 78 through a duct 80. In the bottom of the vacuum chamber 78 is arranged a valve seat 82 engageable by a normally open vacuum valve 83 carried by a depending stem 84.

Diametrically opposite the vacuum chamber 78, the enlargement 70 is provided with an air port 86 in which is arranged a valve seat 87 engageable by a normally closed valve 88. The diaphragm 75 forms with a lower cap 90 a control chamber 91 which normally communicates with the vacuum chamber 78 since the valve 83 is normally open. The chamber 91 is normally disconnected from the atmosphere since the valve 88 is normally closed.

A valve operating lever 93 is arranged in the chamber 91 and has one end engaging a nut 94 threaded on the stem 84 and biased into engagement with the lever 93 by a spring 95. The opposite end of the lever is biased upwardly by a spring 98 to tend to maintain the valve 88 closed. Centrally of its length, the lever 93 is engaged by a spring 99, urging the lever upwardly. A thimble 100 is surrounded by the upper end of the spring 99. This thimble serves to secure the diaphragm 75 and lever 93 to each other and is engaged by the lower end of the plunger 72 to be moved downwardly thereby.

A duct 104 communicates between the chamber 91 and a pipe 105 (Figures 1, 2 and 3). The duct 105 is connected by a branch 106 to the motor chamber 27, and accordingly such chamber is normally in communication with the control chamber 91 of the valve mechanism. The pipe 105 is connected to one end of a valve housing 108, and the other end of such housing is connected by a pipe 109 to the motor chamber 25.

The valve housing 108 (Figure 3) is divided by a partition 110 to form upper and lower chambers 111 and 112 adapted to communicate with each other through a valve seat 113. This seat is engageable by a valve 114, biased to open position by a spring 115 and adapted to be closed in a manner to be described upon energization of a solenoid 116.

The solenoid 116 (Figure 1) has one side grounded as at 120 through a wire 121. The other terminal of the solenoid 116 is connected by a wire 124 to one side of the vehicle battery 125, the other terminal of which is connected to one end of a wire 126 leading to a mercury switch indicated as a whole by the numeral 127. The mercury switch 127 comprises an upwardly and forwardly inclined tube 128 having therein a pair of contacts 129 and 130, connected respectively to the wire 126 and to a ground 131. A body of mercury 134 is arranged in the lower end of the tube 127, normally out of engagement with the contacts 129 and 130. The tube 128 is pivoted as at 135 and the angularity of the tube may be varied by adjusting a screw 136, the free end of the tube 128 being biased upwardly by a spring 137.

The chamber 74 is connected to the motor chamber 26, and the latter chamber accordingly is in constant communication with the source of vacuum (Figure 2). A jumper line 140 (Figure 1) is connected between the chambers 24 and 26 and accordingly, vacuum is also maintained in the motor chamber 24.

Referring to Figure 1, it will be noted that the branch pipe 106 has interposed therein a three-way valve 145 the run 146 of which normally is open through the pipe 106 and the branch 147 of which is normally inoperative. The turning of the three-way valve 90° clockwise from the position shown in Figure 1 disconnects the end of the pipe 106 adjacent the motor 10 from the pipe 105 and connects the inner end of the pipe 106 to a bypass pipe 148 tapped into the motor chamber 26.

The three-way valve is provided with an operating lever 150 connected as at 151 to the armature of a solenoid 152 one side of which is grounded as at 153. The other terminal of the solenoid 152 is connected by a wire 154 to the wire 124 and is controlled by a manually operable switch 155. It will be apparent, therefore, that pressure in the motor chamber 27 is controlled by the valve mechanism shown in Figure 2 when the three-way valve 145 is in the normal position shown in Figure 1. When the three-way valve is turned as described above, the motor chambers 26 and 27 communicate with each other and are not subject to control by the booster motor valve mechanism.

The results obtained by the structure shown in Figure 1 can be obtained with the modified form of the invention shown in Figure 4, but the latter form of the invention is not preferred. Most of the parts shown in Figure 4 correspond to the parts shown in Figure 1 and have been indicated by the same reference numerals.

In place of the jumper line 140, a modified form of jumper line 160 is connected between the motor chambers 24 and 26 and a three-way valve 161 is interposed in the line 160. The run 162 of the three-way valve affords normal communication through the jumper line 160 and the three-way valve is provided with a branch 163 normally diametrically opposite an atmospheric port 164 in the casing of the three-way valve.

Between the three-way valve 161 and the motor chamber 24, the jumper line 160 communicates with one end of a duct 166 leading to a source of vacuum such as the intake manifold 167 of the motor vehicle. It will be apparent, of course, that the vacuum connection 79 (Figure 2) will be connected by a suitable line (not shown) to the intake manifold.

The three-way valve is provided with an operating lever 170 connected as at 171 to the armature of a solenoid 172 having one terminal grounded as at 173. The other terminal of the solenoid is connected to one end of a wire 174, controlled by a manual switch 175 and leading to one terminal of the battery 176, grounded as at 177. Separate sources of current 125 and 176 have been shown in the interest of simplicity, and it will be apparent that the vehicle battery serves as a source of current for both of the solenoids 116 and 172.

Operation

In the form of the invention illustrated in Figures 1, 2 and 3 the parts normally occupy the positions shown. The source of vacuum will be in constant communication with the motor chambers 24 and 26 through chamber 74 (Figure 2), passage 76 (Figure 1) and the jumper line 140. The control chamber 91 (Figure 2) of the valve mechanism will be in constant communication with the motor chambers 25 and 27, it being understood that the valve 114 is normally open as shown in Figure 3.

When the brakes are to be applied, the operator will depress the pedal 67 to displace fluid from the master cylinder 66 through line 65 into the space or chamber 44. Initially, fluid flows through ports 51 into the space 52, thence through passages 53 around the cup 54 to displace fluid from the chamber 55 into the rear wheel cylinders 57. As soon as any static pressure is built up in the chamber 55 incident to initial engagement of the rear brake shoes with the drums, such pressure will act on the plunger 72 to move this plunger downwardly, thus imparting similar movement to the center of the lever 93 (Figure 2). The spring 98 will hold the associated end of the lever 93 upwardly, and the opposite end of such lever will move downwardly to close the vacuum valve 83. The closing movement of such valve limits downward movement of the associated end of the lever 93, whereupon the lever 93 will fulcrum on the nut 94 and the opposite end of the lever will move downwardly. Thus the ball valve 88 will be released for the admission of air into the chamber 91 and thus through pipe 105 and associated elements into the motor chambers 25 and 27.

The pistons 21 and 22 will now move apart and the plunger or rod 30 will displace fluid from the chamber 14 into the front wheel brake cylinders. The piston rod 48, in abutting engagement with the plunger 50, will move this plunger to the right in Figure 1, assisted by foot generated pressures back of the plunger 50, to displace fluid from the chamber 55 into the rear wheel cylinders 57. It will be apparent, therefore, that the front brakes of the truck will be operated solely by pressure generated by the piston 21, while the rear brakes will be applied by pedal generated pressure back of the plunger 50 plus the force transmitted to the plunger 50 by the piston 22. Accordingly, much greater braking forces will be applied at the rear wheels, which is highly desirable when the truck is loaded.

Assuming that the truck is running relatively light, the substantial braking forces normally applied to the rear wheels in proportion to the forces applied to the front wheels will be excessive. Under such conditions, the driver will close the switch 155, thus energizing the solenoid 152 to rotate the three-way valve 145 90° from the position shown in Figure 1. Under such conditions, the branch 147 of the three-way valve will communicate with the motor chamber 27; the run 146 of the three-way valve will communicate with the duct 148 and communication with the line 105 will be cut off.

It will be apparent that under normal conditions when the brake is inoperative, vacuum will exist in both of the motor chambers 26 and 27. When the three-way valve 145 is operated as described, the chambers 26 and 27 will be connected to each other to maintain vacuum in both chambers and the chamber 27 will not be subject to control in accordance with the operation of the valve mechanism in Figure 2.

Under such conditions, operation of the valve mechanism will disconnect the control chamber 91 from the variable pressure motor chamber 25, as described, and the chamber 25 will be connected to the atmosphere to move the piston 21 toward the left in Figure 1 to displace fluid from the chamber 14 into the front wheel brake cylinders 16. This operation obviously will be identical with that described above. However, the valve mechanism in Figure 2 can have no effect on pressures in the motor chamber 27, hence the piston 22 will remain stationary and will be held in its off position by the return spring 36.

The fluid displaced from the master cylinder 66 will flow as described above into the space 52 (Figure 1), thence through passages 53, around the lip of the cup 54 into the chamber 55 and thence through lines 56 into the rear wheel brake cylinders 57. Accordingly, the front wheel brakes will be applied solely by the power of the piston 21 while the rear brakes will be applied solely by foot generated pressures from the master cylinder acting back of the plunger 50. Ordinarily, fluid will flow in the manner described from the space 52 to the chamber 55 without movement of the plunger 50. If, due to fluid friction when the brake pedal is pushed rapidly with substantial force, the fluid cannot flow sufficiently rapidly in the manner described, the plunger 50 is free to move since it has solely an abutting connection with the piston rod 48.

When the system is used on a lightly loaded truck, therefore, pedal generated pressures are wholly depended upon for applying the rear wheel brakes. This is highly desirable and obviously tends to eliminate any locking and sliding of the rear wheels. If a very substantial brake application is made and the rate of vehicle deceleration increases to a predetermined point which might cause the front wheels to lock and slide, the body of mercury 134 (Figure 1) will move forwardly or to the left to bridge across the contacts 129 and 130. Thus the solenoid 116 will be energized and the valve 114 (Figure 3) will be closed to prevent the further admission of air into pipe 109 and thence into motor chamber 25. Energization of the front wheel booster motor unit thus will be limited to prevent the locking of the front wheel brakes.

While both pipe lines 106 and 109 are mainly subject to control by the valve mechanism shown in Figure 2 to control pressures in the motor chambers 25 and 27, these pipe lines are separately subject to control by the three-way valve 145 and the solenoid operated valve 114, thus providing means for taking care of various vehicle operating conditions. The solenoid operated valve 114 will function regardless of the position of the three-way valve 145 in accordance with the rate of vehicle deceleration, thus preventing the locking of the front wheels under any conditions. The three-way valve 145 is under the control of the operator. This valve provides for the complete immobilization of the rear wheel booster motor unit when the truck is running light or only slightly loaded. When the truck is loaded beyond a predetermined point, it is desirable to maintain the three-way valve 145 in the normal position shown in Figure 1 so as to provide for both power and manual operation of the rear wheel brake cylinders. Regardless of the conditions of operation of the system, pressures generated in the space 52 will react against the brake pedal 67 to provide direct proportionate hydraulic reaction against the pedal, as is highly desirable.

The operation of the form of the invention shown in Figure 4 provides the same general results as referred to above and need not be described in detail. All of the booster motor parts shown in Figure 4 correspond to those shown in Figure 1, except that no passage corresponding to the passage 76 in Figure 1 communicates with the vacuum chamber 74 of the valve mechanism and the motor chamber 26, and except for the fact that the jumper line 160 and its three-way valve are substituted for the jumper line 140. In the system shown in Figure 4, the intake manifold 167 is always in communication with the motor chamber 24 and normally is in communication with the motor chamber 26. If the truck is running light, the switch 175 will be closed to energize the solenoid 172, thus turning the three-way valve 161 90° clockwise from the position shown in Figure 1.

The operation referred to cuts off communication between the vacuum line 166 and the rear end of the jumper line 160 and connects the latter through the valve branch 163, run 162 and port 164 with the atmosphere. Thus air will be admitted into the motor chamber 26 and atmospheric pressure will be maintained in this chamber until the three-way valve 161 is returned to its normal position. Thus it is impossible under any conditions to establish in the motor chamber 27 a pressure greater than the pressure in the motor chamber 26. Hence the rear booster motor unit will be completely immobilized as in Figure 1 and the rear wheel brakes will be applied in the manner described solely by pedal generated pressures.

When the truck is loaded, the three-way valve 161 will be maintained in its normal position shown in Figure 4. Both chambers 24 and 26 of the motor will then remain constant pressure vacuum chambers, and the motor units will be subject to control by the valve mechanism in Figure 2 and the apparatus will function exactly the same as the apparatus shown in Figure 1. In fact, all parts of the apparatus will function fully as described, including the mercury switch 127 and the circuit controlled thereby.

The form of the invention shown in Figure 1 is preferred over the form of the invention shown in Figure 4. In the latter form of the invention, immobilization of the piston 22 is accomplished by dumping air into the motor chamber 26. When the valve 161 is returned to its normal position, it is necessary to evacuate air from the chamber 26. This results in a rapid admission of air into the intake manifold, which is undesirable although it does not affect the operativeness of the system. In Figure 1, the chamber 26 is always connected to the source of vacuum. Hence, if the three-way valve 145 is turned in either direction while the system is inoperative, there will be no rush of air into the intake manifold. This could occur only if the valve 145 is turned from its normal position in Figure 1 during an actual brake operation, and this is a wholly unlikely procedure.

In view of the foregoing, it will be apparent that the present system is particularly adapted for use on trucks and has been found especially advantageous on light delivery trucks. The system provides means under the control of the operator for providing minimum rear brake applications solely by foot generated forces when the vehicle is traveling light and maximum rear brake applications when the vehicle is loaded. Such a system also is advantageous in combination with the inertia-controlled valve 114 (Figure 3) particularly if an emergency stop is made with the rear wheel booster motor inoperative. Under such conditions, the operator will generate maximum foot generated pressures in the chamber 55, thus causing maximum energization of the front wheel booster motor, which may be sufficient to lock the front wheels. The inertia-controlled valve 114 prevents such locking of the front wheels and not only eliminates excessive tire wear, but permits a more rapid vehicle deceleration under such conditions since the front brakes will be more effective if traction is maintained.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism for a motor vehicle having front and rear wheel cylinders, comprising a pair of motor units each having a casing and a pressure responsive unit forming with said casing a variable pressure chamber, a first hydraulic chamber connected to the front wheel cylinders, a plunger movable into said hydraulic chamber and connected to one of said pressure responsive units, a second hydraulic chamber connected to the rear wheel cylinders, a second plunger in said second hydraulic chamber, a rod connected to the other pressure responsive unit and having abutting engagement with said second plunger, a valve mechanism connected between said variable pressure chambers and sources of high and low pressures, hydraulic means connected for operating said valve mehanism to disonnect said variable pressure chambers from one source and connect them to the other source to operate said pressure responsive units, pedal operable fluid displacing means connected to said hydraulic means to operate it, said pedal operable means being connected to said second hydraulic chamber back of said second plunger to apply forces thereto to operate it, and solely manually controllable means operable independently of said valve mechanism for preventing said valve mechanism from changing pressures affecting said other pressure responsive unit whereby such pressure responsive unit will be immobilized and solely forces from said pedal operable means will be applied to said second plunger to operate it.

2. A mechanism according to claim 1 wherein said other pressure responsive unit is arranged between its variable pressure chamber and a constant pressure chamber connected to said low pressure source, said manually controllable means comprising a three-way valve normally connecting said last-mentioned variable pressure chamber to said valve mechanism and being operable for disconnecting such chamber from said valve mechanism and connecting it to said constant pressure chamber.

3. A booster brake mechanism for a motor vehicle having front and rear wheel cylinders, comprising a motor mechanism having a pair of fluid pressure motor units each comprising a pressure responsive unit dividing it to form a variable pressure chamber and a normally constant low pressure chamber, a first hydraulic chamber connected to the front wheel cylinders, a first plunger connected to one pressure responsive unit and operable in said chamber, a second hydraulic chamber connected to the rear wheel cylinders, a second hydraulic plunger in said second chamber, a piston rod connected to the other pressure responsive unit and having abutting engagement with said second plunger, a valve mechanism connected to said variable pressure chambers and to sources of high and low pressures and normally connecting said variable pressure chambers to said low pressure source, pedal operable means connected to supply hydraulic fluid back of said second plunger to transmit force thereto and to operate said valve mechanism to connect said variable pressure chambers to said high pressure source to subject both pressure responsive units to differential pressure to move them and transmit forces to said plungers, and a solely manually operable valve connected to prevent said valve mechanism from changing pressures on opposite sides of said other pressure responsive unit whereby such unit will be immobilized and solely forces from said pedal operable means will be applied to said second plunger to operate it.

4. A mechanism according to claim 3 provided with means connected to be responsive to a predetermined degree of vehicle deceleration for limiting the increasing of pressure in the variable pressure chamber associated with said one pressure responsive unit.

5. A booster brake mechanism for a motor vehicle having front and rear wheel cylinders, comprising a motor mechanism having a pair of fluid pressure motor units each comprising a pressure responsive unit dividing it to form a variable pressure chamber and a normally constant pressure chamber, a duct connecting said constant pressure chambers to normally balance pressures therein, a first hydraulic chamber connected to the front wheel cylinders, a first plunger connected to one pressure responsive unit and operable in said chamber, a second hydraulic chamber connected to the rear wheel cylinders, a second hydraulic plunger in said second chamber, a piston rod connected to the other pressure responsive unit and having abutting engagement with said second plunger, a valve mechanism connected to said variable pressure chambers and to a source of vacuum and the atmosphere and normally connecting said variable pressure chambers to said vacuum source, pedal operable means connected to supply hydraulic fluid back of said second plunger to transmit force thereto and to operate said valve mechanism to connect said variable pressure chambers to the atmosphere to operate both pressure responsive units, means connecting said duct intermediate its ends to said vacuum source, and solely manually controlled means in said duct between said connecting means and the constant pressure chamber associated with said other pressure responsive unit for closing said duct and for maintaining communication between said last-mentioned constant pressure chamber and the atmosphere.

6. A mechanism according to claim 5 wherein said manually controlled means comprises a three-way valve normally positioned to open said duct therethrough, a solenoid connected to said three-way valve and energizable to move it to close communication through said duct and open said last-mentioned constant pressure chamber to the atmosphere, and a circuit for said solenoid comprising a manually controllable switch.

7. A mechanism according to claim 5 provided with an auxiliary valve connected between said valve mechanism and the variable pressure chamber associated with said one pressure responsive unit, and means connected to said auxiliary valve and operable for closing it when the rate of vehicle deceleration exceeds a predetermined point.

8. A mechanism according to claim 5 wherein said manually controlled means comprises a three-way valve normally positioned to open said duct therethrough, a solenoid connected to said three-way valve and energizable to move it to close communication through said duct and open said last-mentioned constant pressure chamber to the atmosphere, and a circuit for said solenoid comprising a manually controllable switch, and means connected to be responsive to a predetermined rate of vehicle deceleration for limiting the admission of air into the variable pressure chamber associated with said one pressure responsive unit when said valve mechanism is being operated.

9. A booster brake mechanism for a motor vehicle having front and rear wheel cylinders comprising a pair of motor units each having a casing and a pressure responsive unit forming with said casing a variable pressure chamber, a first hydraulic chamber connected to the front wheel cylinders, a plunger movable into said hydraulic chamber and connected to one of said pressure responsive units, a second hydraulic chamber connected to the rear wheel cylinders, a second plunger in said second hydraulic chamber, a rod connected to the other pressure responsive unit and having abutting engagement with said second plunger, a valve mechanism connected between said variable pressure chambers and sources of high and low pressures, pedal operable means connected to said second plunger to apply force thereto to operate it and connected for operating said valve mechanism to disconnect said variable pressure chambers from one source and connect them to the other source to operate said pressure responsive units, and solely manually operable means operable independently of said valve mechanism for preventing said valve mechanism from changing pressures affecting said other pressure responsive unit whereby such pressure responsive unit will be immobilized and solely force from said pedal operable means will be applied to said second plunger to operate it.

10. A booster brake mechanism for a motor vehicle having front and rear wheel cylinders, comprising a motor mechanism having a pair of fluid pressure motor units each comprising a pressure responsive unit dividing it to form a variable pressure chamber and a normally constant pressure chamber, a duct connecting said constant pressure chambers to normally balance pressures therein, a first hydraulic chamber connected to the front wheel cylinders, a first plunger connected to one pressure responsive unit and operable in said chamber, a second hydraulic chamber connected to the rear wheel cylinders, a second hydraulic plunger in said second chamber, a piston rod connected to the other pressure responsive unit and having abutting engagement with said second plunger, a valve mechanism connected to said variable pressure chambers and to a source of vacuum and the atmosphere and normally connecting said variable pressure chambers to said vacuum source, pedal operable means connected to said second plunger to transmit force thereto and connected to said valve mechanism to operate it to connect said variable pressure chambers to the atmosphere to operate both pressure responsive units, means connecting said duct intermediate its ends to said vacuum source, and solely manually controlled means in said duct between said connecting means and the constant pressure chamber associated with said other pressure responsive unit for closing said duct and for establishing and maintaining communication between said last-mentioned constant pressure chamber and the atmosphere.

References Cited in the file of this patent
UNITED STATES PATENTS

| 1,644,558 | Bartholomew | Oct. 4, 1927 |
| 1,713,992 | Bragg et al. | May 21, 1929 |
| 2,353,755 | Price | July 18, 1944 |
| 2,402,344 | Price | June 18, 1946 |
| 2,467,517 | Almond | Apr. 19, 1949 |
| 2,726,739 | Jeanson | Dec. 13, 1955 |
| 2,747,697 | Banker | May 29, 1956 |
| 2,845,147 | Hill | July 29, 1958 |